United States Patent
Xu et al.

(10) Patent No.: US 11,836,882 B2
(45) Date of Patent: Dec. 5, 2023

(54) THREE-DIMENSIONAL POINT CLOUD-BASED INITIAL VIEWING ANGLE CONTROL AND PRESENTATION METHOD AND SYSTEM

(71) Applicant: Shanghai Jiao Tong University, Shanghai (CN)

(72) Inventors: Yiling Xu, Shanghai (CN); Linyao Gao, Shanghai (CN); Wenjie Zhu, Shanghai (CN); Yunfeng Guan, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 30 days.

(21) Appl. No.: 17/595,808

(22) PCT Filed: Jun. 28, 2020

(86) PCT No.: PCT/CN2020/098517
§ 371 (c)(1),
(2) Date: Nov. 24, 2021

(87) PCT Pub. No.: WO2020/259682
PCT Pub. Date: Dec. 30, 2020

(65) Prior Publication Data
US 2022/0148280 A1 May 12, 2022

(30) Foreign Application Priority Data

Jun. 28, 2019 (CN) .......................... 201910576254.0
Jul. 2, 2019 (CN) .......................... 201910590125.7

(51) Int. Cl.
*G06T 19/00* (2011.01)
*G06T 19/20* (2011.01)
*G06F 3/01* (2006.01)

(52) U.S. Cl.
CPC .............. *G06T 19/20* (2013.01); *G06F 3/011* (2013.01); *G06T 2210/56* (2013.01); *G06T 2219/2016* (2013.01)

(58) Field of Classification Search
None
See application file for complete search history.

(56) References Cited

U.S. PATENT DOCUMENTS

| | | | |
|---|---|---|---|
| 10,803,665 B1 * | 10/2020 | Patel .................... | A63F 13/5255 |
| 2014/0038708 A1 * | 2/2014 | Davison .................. | A63F 13/69 463/31 |

(Continued)

FOREIGN PATENT DOCUMENTS

| CN | 104768018 A | 2/2015 |
|---|---|---|
| CN | 105704468 A | 6/2016 |

(Continued)

OTHER PUBLICATIONS

First Office Action, dated Sep. 5, 2022 Chinese Patent Application No. 201910590125.7, International Filing Date Jul. 2, 2019.

(Continued)

*Primary Examiner* — Martin Mushambo
(74) *Attorney, Agent, or Firm* — ArentFox Schiff LLP (57) ABSTRACT

Provided are an initial view angle control and presentation method and system based on a three-dimensional point cloud and a point cloud system. A three-dimensional media stream is read and parsed. An initial viewpoint, a normal vector and a forward direction vector in the three-dimensional media stream are parsed. A user can view an initial angle, that is, a region of interest, designated by a content producer when initially consuming three-dimensional media content. Moreover, scaling, that is, scale transformation, of the three-dimensional media content is allowed in an optimized manner. In a real-time interactive scene, the view range of the user can be adjusted based on the position of the (Continued)

user relative to the initial viewpoint. The freedom degree of visual media consumption is fully improved according to the interactive behavior of the user, providing an immersive user experience.

14 Claims, 5 Drawing Sheets

(56) References Cited

U.S. PATENT DOCUMENTS

| | | | |
|---|---|---|---|
| 2015/0145891 A1 | 5/2015 | Kuffner et al. | |
| 2016/0025627 A1* | 1/2016 | Stopper | G06V 20/56 356/337 |
| 2016/0156944 A1* | 6/2016 | Hattori | H04N 21/2368 725/116 |
| 2017/0251204 A1* | 8/2017 | Gupte | H04N 19/597 |
| 2017/0256072 A1* | 9/2017 | Shimmoto | G06V 10/95 |
| 2018/0020238 A1* | 1/2018 | Liu | H04N 19/124 |
| 2018/0020248 A1* | 1/2018 | Lai | H04N 21/2353 |
| 2018/0035172 A1* | 2/2018 | Lai | H04N 21/234363 |
| 2019/0068946 A1* | 2/2019 | Stockhammer | H04N 21/816 |
| 2019/0158933 A1* | 5/2019 | Ouedraogo | H04N 21/816 |
| 2019/0174116 A1* | 6/2019 | Oh | H04N 13/194 |
| 2019/0246162 A1* | 8/2019 | Yang | H04N 21/4781 |
| 2019/0320156 A1* | 10/2019 | Oh | H04N 19/597 |
| 2020/0051323 A1* | 2/2020 | Araki | G06T 7/55 |
| 2020/0084428 A1* | 3/2020 | Oh | H04N 13/194 |
| 2020/0302632 A1* | 9/2020 | Oh | G06T 7/187 |
| 2020/0374505 A1* | 11/2020 | Kammachi Sreedhar | H04N 13/243 |
| 2020/0388044 A1* | 12/2020 | Cen | G06T 7/80 |
| 2022/0095001 A1* | 3/2022 | Harviainen | H04N 21/85406 |
| 2022/0139040 A1* | 5/2022 | Liu | G06T 7/70 345/419 |

FOREIGN PATENT DOCUMENTS

| | | |
|---|---|---|
| CN | 106447788 A | 2/2017 |
| CN | 106981098 A | 7/2017 |
| CN | 107330122 A | 11/2017 |
| CN | 107659851 A | 2/2018 |
| CN | 107945231 A | 4/2018 |
| CN | 108074278 A | 5/2018 |
| CN | 108227916 A | 6/2018 |
| CN | 108320334 A | 7/2018 |
| CN | 108702528 A | 10/2018 |
| CN | 109272527 A | 1/2019 |
| CN | 110944222 A | 3/2020 |
| JP | 2016224823 A | 12/2016 |
| JP | 2017036998 A | 2/2017 |
| WO | 2018/025660 A1 | 2/2018 |
| WO | 2019/078580 | 4/2019 |

OTHER PUBLICATIONS

Tao, Zhipeng et al., Research on Real-Time Visualization of Massive Three Dimensional Topographic Data, 2013, 22-23.
European Search Report dated Jun. 2, 2023 from corresponding European Application No. 20831860.0.
Park Jounsup et al: "Rate-Utility Optimized Streaming of Volumetric Media for Augmented Reality", IEEE Journal on Emerging and Selected Topics in Circuits and Systems, IEEE, Piscataway, NJ, USA, vol. 9, No. 1, Mar. 1, 2019 (Mar. 1, 2019), pp. 149-162, XP011714052, ISSN: 2156-3357, DOI: 10.1109/JETCAS.2019. 2898622; retrieved on Mar. 8, 2019.
International Search Report for PCT/CN2020/098517 dated Oct. 10, 2020.
Office action dated Nov. 22, 2022 from corresponding Japanese Application No. 2021-570458.

* cited by examiner

FIG. 3-3

THREE-DIMENSIONAL POINT CLOUD-BASED INITIAL VIEWING ANGLE CONTROL AND PRESENTATION METHOD AND SYSTEM

CROSS-REFERENCE TO RELATED APPLICATIONS

This is a national stage application filed under 37 U.S.C. 371 based on International Patent Application No. PCT/CN2020/098517, filed on Jun. 28, 2020, which is based on and claims priority to a Chinese Patent Application No. CN201910576254.0 filed on Jun. 28, 2019 and a Chinese Patent Application No. CN201910590125.7 filed on Jul. 2, 2019, disclosures of which are expressly incorporated by referenced herein in their entirety.

TECHNICAL FIELD

The present disclosure relates to the field of designing 3D media data encapsulation and consumption processes and, in particular, to an initial view angle control and presentation method and system based on a three-dimensional point cloud.

BACKGROUND

With the rapid development of information technology, the consumption mode based on words, pictures and traditional videos is almost mature, and more realistic, more interactive and more diversified visual communication gradually become a development hotspot. Visual communication provides a user with an immersive real-world experience by using techniques including accurately rendered three-dimensional point cloud, omni-directional six-degrees-of-freedom experience, virtuality and reality combination and real-time interaction. The real-world experience is not restricted by time, regions and realistic conditions. Visual communication also provides infinite space for new applications.

Visual media data is much different from traditional media data in terms of data generation, data transmission, data processing and data presentation. Visual media data is more complex and diversified than traditional media data. To satisfy presentation requirements of the user, the corresponding data description method has received extensive attention. Thanks to the increasing maturity of the three-dimensional scanning technology and system, three-dimensional point cloud data has attracted extensive attention in the academic and industrial circles.

A three-dimensional point cloud is a set of data points in space. The cloud records information about each point of the surface of a scanned object. The recorded information includes a set of three-dimensional coordinate information and various attribute information such as texture, material, normal vector and reflection intensity. Three-dimensional point cloud data is a geometric description of a real object and is a new three-dimensional model data format. As a main carrier for expressing information in a visual communication scene, three-dimensional point cloud data can not only effectively represent a static object or scene in a visual media service, but can also render an accurate three-dimensional model in real time to truly describe information about a dynamic object or scene. Therefore, three-dimensional point cloud data enables the user to enjoy an immersive consumption experience featured by virtuality and reality combination and real-time interaction.

At present, there has been some research on how to store and transmit three-dimensional point cloud data. However, existing three-dimensional point cloud encapsulation information takes into account only the overall presentation effect of point cloud data and does not take into account presentation requirements of the user in different scenes, such as the user's initial presentation requirements of three-dimensional point cloud media. When opening a point cloud media file, the user hopes to consume a region of interest and does not hope to consume a region viewed at a strange angle or a region not attracting the interest of the user.

SUMMARY

In view of disadvantages in the existing art, to satisfy initial presentation requirements of a user in different scenes, the present disclosure provides an initial view angle control and presentation method and system based on a three-dimensional point cloud and a point cloud system. Encapsulation information of three-dimensional point cloud media data is expanded and initial view angle information of the three-dimensional point cloud being presented is defined. In this manner, the user can view an initial view angle, that is, a region of interest, designated by a content producer when initially consuming three-dimensional media content, thereby satisfying the user's initial presentation requirements of three-dimensional visual media.

The initial view angle control and presentation method based on a three-dimensional point cloud according to the present disclosure includes reading and parsing a three-dimensional media stream; determining an initial viewpoint, a normal vector direction of the initial viewpoint and a forward direction vector of the initial viewpoint; and presenting media content in the three-dimensional media stream based on the initial viewpoint, the normal vector direction of the initial viewpoint and the forward direction vector of the initial viewpoint.

Optionally, the method according to the present disclosure further includes determining a scaling scale designated by a content producer or determining a scaling scale set based on a depth value calculated based on a relative displacement; and presenting part or all of the media content in the three-dimensional media stream at the scaling scale.

Optionally, in the method according to the present disclosure, the scaling scale is a scaling factor of the media content in the three-dimensional media stream.

Optionally, the method according to the present disclosure further includes feeding back a relative displacement of a user position relative to the initial viewpoint; determining a view range at the user position based on the field of view of the viewpoint at the user position and the depth of the relative displacement; and presenting part or all of the media content in the view range in the three-dimensional media stream.

Optionally, in the method according to the present disclosure, the depth is the distance from the user position to the initial viewpoint.

Optionally, in the method according to the present disclosure, the field of view of the viewpoint is a circular field of view whose center is an initial user position point and whose radius is the distance from the initial user position point to the initial viewpoint.

Optionally, in response to the media content being rotated, the method according to the present disclosure further includes changing the initial viewpoint and the normal vector direction of the initial viewpoint to form a position of the changed viewpoint and a normal vector direction of the changed viewpoint.

Optionally, in the method according to the present disclosure, the forward direction vector of the initial viewpoint is a direction vector parallel to a forward direction specified by a presentation device, and the forward direction vector of the initial viewpoint includes x coordinate information, y coordinate information and z coordinate information of a forward direction vector endpoint other than the initial viewpoint. The x coordinate information, the y coordinate information and the z coordinate information are in a coordinate system whose origin is the initial viewpoint.

Optionally, in the method according to the present disclosure, the three-dimensional media stream is formed from encapsulated three-dimensional media data, and indication information is added to encapsulation information of the three-dimensional media data. The indication information includes information one: position information of the initial viewpoint; information two: position information of a normal vector of the initial viewpoint relative to the initial viewpoint; and information three: information about the forward direction vector of the initial viewpoint.

Optionally, in the method according to the present disclosure, the indication information further includes information four: information about the scaling scale of the three-dimensional media.

Optionally, in the method according to the present disclosure, the indication information further includes information five: position information of a changed viewpoint and position information of a normal vector of the changed viewpoint relative to the changed viewpoint.

Optionally, in the method according to the present disclosure, the indication information further includes information six: real-time relative displacement which is position information of a real-time user position relative to the initial viewpoint; and information seven: a view range adjusted based on the real-time user position.

Optionally, in the method according to the present disclosure, the indication information further includes rotation indication information for indicating whether the media content is rotatable.

Optionally, in the method according to the present disclosure, the indication information further includes information for indicating whether real-time user position interaction is allowed during media playback.

Optionally, in the method according to the present disclosure, a normal vector of the initial viewpoint includes x coordinate information, y coordinate information and z coordinate information of a normal vector endpoint other than the initial viewpoint. The x coordinate information, the y coordinate information and the z coordinate information are in a coordinate system whose origin is the initial viewpoint.

Optionally, in the method according to the present disclosure, a relative displacement of a user position relative to the initial viewpoint includes x coordinate information, y coordinate information and z coordinate information of a user viewing position. The x coordinate information, the y coordinate information and the z coordinate information are in a coordinate system whose origin is the initial viewpoint.

Optionally, in the method according to the present disclosure, in response to the media content being rotated, the position of a changed viewpoint includes x coordinate information, y coordinate information and z coordinate information of the changed viewpoint.

Optionally, in the method according to the present disclosure, in response to the media content being rotated, a normal vector direction of a changed viewpoint includes x coordinate information, y coordinate information and z coordinate information of a normal vector endpoint other than the changed viewpoint. The x coordinate information, the y coordinate information and the z coordinate information are in a coordinate system whose origin is the changed viewpoint.

The initial view angle control and presentation system based on a three-dimensional point cloud according to the present disclosure includes a parsing module configured to read and parse a three-dimensional media stream; an initial view angle determination module configured to determine an initial viewpoint, a normal vector direction of the initial viewpoint and a forward direction vector of the initial viewpoint; and a three-dimensional media presentation module configured to present media content in the three-dimensional media stream based on the initial viewpoint, the normal vector direction of the initial viewpoint and the forward direction vector of the initial viewpoint.

Optionally, the system according to the present disclosure further includes a displacement feedback module configured to feed back a relative displacement of a real-time user position relative to the initial viewpoint; a scaling scale determination module configured to determine a scaling scale designated by a content producer or determine a scaling scale set based on a depth value calculated based on the relative displacement; a view range determination module configured to determine a view range at the user position based on the field of view of the viewpoint at the user position and a depth value; and a three-dimensional media presentation module configured to present media content in the view range in the three-dimensional media stream based on the initial viewpoint, the normal vector direction of the initial viewpoint and the forward direction vector of the initial viewpoint.

Optionally, the system according to the present disclosure further includes a scaling scale determination module configured to determine a scaling scale designated by a content producer or determine a scaling scale set based on a depth value calculated based on a relative displacement; and a three-dimensional media presentation module configured to present part or all of the media content in the three-dimensional media stream at the scaling scale.

Optionally, the system according to the present disclosure further includes a changed viewpoint determination module configured to, in response to the media content being rotated, change the initial viewpoint and the normal vector direction to determine a position of the changed viewpoint and a normal vector direction of the changed viewpoint.

Optionally, in the system according to the present disclosure, the three-dimensional media stream is formed form encapsulated three-dimensional media data, and indication information is added to encapsulation information of the three-dimensional media data. The indication information includes information one: position information of the initial viewpoint; information two: position information of a normal vector of the initial viewpoint relative to the initial viewpoint; and information three: information about the forward direction vector of the initial viewpoint.

Optionally, in the system according to the present disclosure, the indication information further includes information four: information about the scaling scale of the three-dimensional media.

Optionally, in the system according to the present disclosure, the indication information further includes information five: position information of a changed viewpoint and position information of a normal vector of the changed viewpoint relative to the changed viewpoint.

Optionally, in the system according to the present disclosure, the indication information further includes information six: real-time relative displacement which is position information of a real-time user position relative to the initial viewpoint; and information seven: a view range adjusted based on the real-time user position.

Optionally, in the system according to the present disclosure, the indication information further includes rotation indication information for indicating whether the media content is rotatable.

Optionally, in the system according to the present disclosure, the indication information further includes information for indicating whether real-time user position interaction is allowed during media playback.

The present disclosure further provides a point cloud system.

The present disclosure further provides a three-dimensional point cloud system. The three-dimensional point cloud system includes the preceding initial view angle control and presentation system based on a three-dimensional point cloud.

Compared with the existing art, the present disclosure has the beneficial effects below.

In the initial view angle control and presentation method and system based on a three-dimensional point cloud and the point cloud system according to the present disclosure, the initial viewpoint, the normal vector of the initial viewpoint and the forward direction vector of the initial viewpoint in the three-dimensional media stream are read and parsed. In this manner, the user can view an initial angle, that is, a region of interest, designated by a content producer when initially consuming three-dimensional media content. Moreover, scaling, that is, scale transformation, of the three-dimensional media content is allowed in an optimized manner. In a real-time interactive scene, the view range of the user can be adjusted based on the position of the user relative to the initial viewpoint. The freedom degree of visual media consumption is fully improved according to the interactive behavior of the user, providing an immersive user experience.

BRIEF DESCRIPTION OF DRAWINGS

Other features, objects and advantages of the present disclosure will become more apparent from a detailed description of non-limiting embodiments with reference to the drawings below.

FIG. 3-1 is an overall view illustrating the relationship between a real-time user viewing position and the field of view at the current user position according to an embodiment of the present disclosure.

FIG. 3-2 is a section view illustrating the relationship between a real-time user viewing position and the field of view at the current user position according to an embodiment of the present disclosure.

FIG. 3-3 is a schematic view illustrating the relationship between a relative displacement of a real-time user position relative to an initial viewpoint and the depth value of the current position according to an embodiment of the present disclosure.

DETAILED DESCRIPTION

The present disclosure is described in detail hereinafter in conjunction with embodiments. The embodiments below assist those skilled in the art in further understanding the present disclosure and do not limit the present disclosure in any form. It is to be noted that for those of ordinary skill in the art, modifications and improvements may be made without departing from the concept of the present disclosure. All these belong to the scope of the present disclosure.

Figure 1:
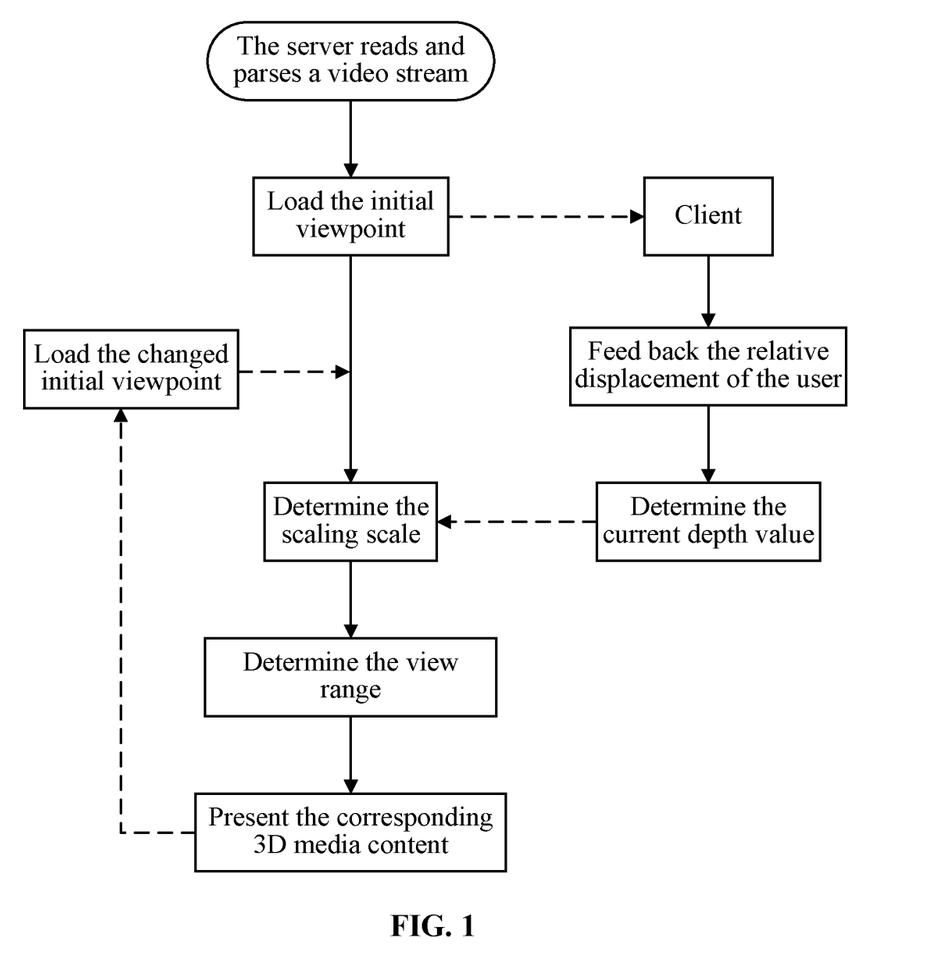
FIG. 1 is a flowchart of an initial view angle control and presentation method based on a three-dimensional point cloud according to an embodiment of the present disclosure.

As shown in FIG. 1, the initial view angle control and presentation method based on a three-dimensional point cloud according to the present disclosure includes the steps below.

In the step of parsing, a three-dimensional media stream is read and parsed.

In the step of determining an initial view angle, an initial viewpoint, a normal vector direction of the initial viewpoint and a forward direction vector of the initial viewpoint are determined.

In the step of presenting three-dimensional media, media content in the three-dimensional media stream is presented based on the initial viewpoint, the normal vector direction of the initial viewpoint and the forward direction vector of the initial viewpoint.

Figure 31:
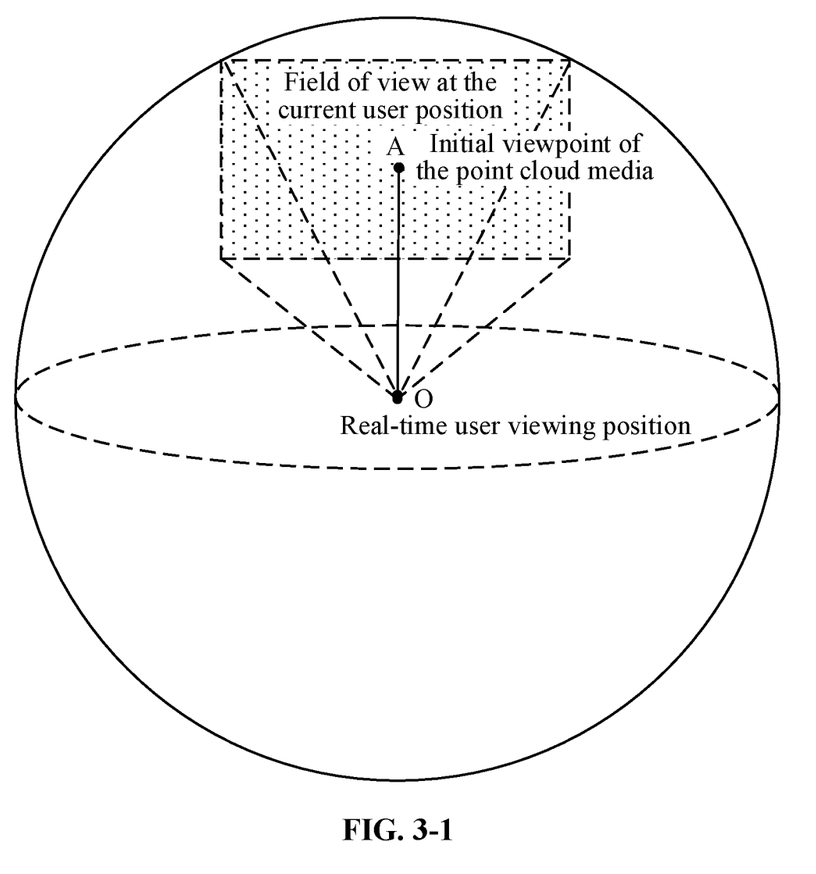

As can be seen from FIG. 3-1, the initial viewpoint A of the point cloud media is a point among the point cloud data, that is, media content of the point cloud target. Point A is the origin of a three-dimensional Cartesian coordinate system by default or is a point in a designated coordinate system.

The definition of the initial viewpoint is specified by the coding layer. The initial viewpoint is used for presentation and used as decoding assistance information. In general, the initial viewpoint is a point among the point cloud data and is represented by three-dimensional Cartesian coordinates. In this embodiment, other user interactive behaviors are specified by the system layer.

Optimally, the present disclosure may further include at least one or any combination of the following operations: scaling a three-dimensional media content presentation, determining a view range based on a real-time user viewing position, or allowing rotation of the three-dimensional media content. A detailed description is given below using variations.

Variation (1) below describes the case of allowing rotation of three-dimensional media content.

In addition to the preceding step of parsing and the preceding step of determining an initial view angle, further included are the step of changing a viewpoint and the step of presenting three-dimensional media. In the step of changing a viewpoint, in response to the media content being rotated, the initial viewpoint and the normal vector direction are changed, and the position of the changed viewpoint and a normal vector direction of the changed viewpoint are determined. In the step of presenting three-dimensional media, the media content in the three-dimensional media stream is presented according to the position of the changed viewpoint and the normal vector direction of the changed viewpoint.

Variation (2) below describes the case of allowing scaling a three-dimensional media content presentation.

In addition to the preceding step of parsing and the preceding step of determining an initial view angle, further included are the step of determining a scaling scale and the step of presenting three-dimensional media. In the step of determining a scaling scale, a scaling scale designated by a content producer is determined; or the current depth value is determined based on a relative displacement of a user position relative to the initial viewpoint, and a scaling scale is set based on the depth value. In the step of presenting three-dimensional media, part or all of the media content in the three-dimensional media stream is presented at the scaling scale.

The scaling scale is a scaling parameter set for the point cloud data. Minification or magnification of the point cloud data is determined according to the scaling scale.

Variation (3) below describes the case of allowing a real-time user viewing position.

In addition to the preceding step of parsing and the preceding step of determining an initial view angle, further included are the step of feeding back a displacement, the step of determining a view range and the step of presenting three-dimensional media.

In the step of feeding back a displacement, the relative displacement of the user position relative to the initial viewpoint is fed back according to the real-time user viewing position (the real-time user viewing position O in FIG. 3-1). In the step of determining a view range, the current depth value is determined based on the relative displacement of the user position relative to the initial viewpoint, and the view range at the current user position is determined based on the relationship between the field of view of the viewpoint at the user position. In the step of presenting three-dimensional media, part media content corresponding to the view range in the three-dimensional media stream is presented, or all of the media content in the three-dimensional media stream is presented.

The relative displacement is position information of the real-time user position relative to the initial viewpoint. The depth value is the modulus of the relative displacement, that is, the distance from the user position to the initial viewpoint.

Figure 33:
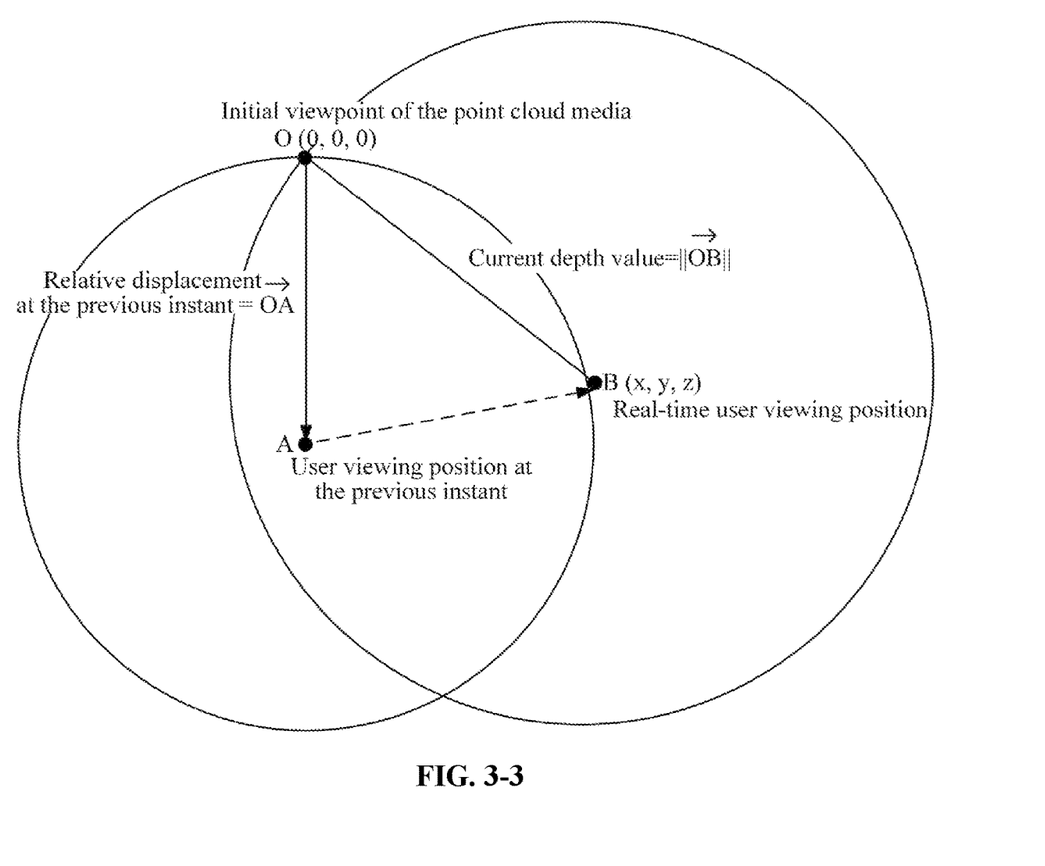

As shown in FIG. 3-3, the depth value of the current position is determined based on the relative displacement of the real-time user position relative to the initial viewpoint. The depth value at the current position is calculated using the formula below.

$$D_t = \sqrt{x^2 + y^2 + z^2}$$

$D_t$ denotes the depth value at the current position. The initial viewpoint is the origin O (0, 0, 0) of coordinates. The coordinates of the real-time user position B are (x, y, z).

Variation (4) below describes the case of combining the following operations: scaling a three-dimensional media content presentation, determining a view range based on a real-time user viewing position and allowing rotation of three-dimensional media content.

In addition to the preceding step of parsing and the preceding step of determining an initial view angle, further included are the step of feeding back a displacement, the step of determining a view range, the step of determining a scaling scale, the step of changing a viewpoint and the step of presenting three-dimensional media. In the step of feeding back a displacement, the relative displacement of the user position relative to the initial viewpoint is fed back according to the real-time user viewing position (the real-time user viewing position O in FIG. 3-1). In the step of determining a view range, the current depth value is determined based on the relative displacement of the user position relative to the initial viewpoint, and the view range at the current user position is determined based on the relationship between the field of view of the viewpoint at the user position. In the step of determining a scaling scale, a scaling scale designated by a content producer is determined; or the current depth value is determined based on a relative displacement of a user position relative to the initial viewpoint, and a scaling scale is set based on the depth value. In the step of changing a viewpoint, in response to the media content being rotated, the initial viewpoint and the normal vector direction are changed, and the position of the changed viewpoint and a normal vector direction of the changed viewpoint are determined. In the step of presenting three-dimensional media, the media content in the three-dimensional media stream is presented according to the position of the changed viewpoint and the normal vector direction of the changed viewpoint.

The relative displacement is position information of the real-time user position relative to the initial viewpoint. The depth value is the modulus of the relative displacement, that is, the distance from the user position to the initial viewpoint.

As shown in FIG. 3-3, the depth value of the current position is determined based on the relative displacement of the real-time user position relative to the initial viewpoint. The depth value at the current position is calculated using the formula below.

$$D_t = \sqrt{x^2 + y^2 + z^2}$$

$D_t$ denotes the depth value at the current position. The initial viewpoint is the origin O (0, 0, 0) of coordinates. The coordinates of the real-time user position B are (x, y, z). The scaling scale is a scaling parameter set for the point cloud data. Minification or magnification of the point cloud data is determined according to the scaling scale.

The present disclosure further provides an initial view angle control and presentation system based on a three-dimensional point cloud. The system includes a parsing module configured to read and parse a three-dimensional media stream; an initial view angle determination module configured to determine an initial viewpoint, a normal vector direction of the initial viewpoint and a forward direction vector of the initial viewpoint; and a three-dimensional media presentation module configured to present media content in the three-dimensional media stream based on the initial viewpoint, the normal vector direction of the initial viewpoint and the forward direction vector of the initial viewpoint.

Figure 2:
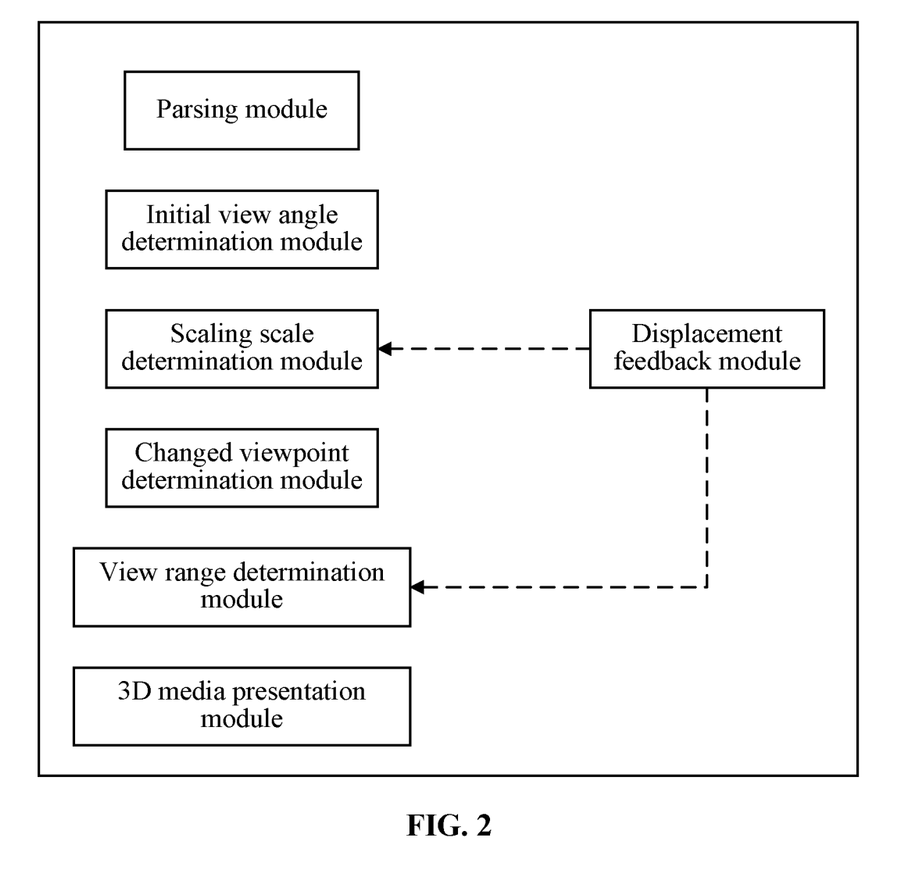
FIG. 2 is a block diagram of an initial view angle control and presentation system based on a three-dimensional point cloud according to an embodiment of the present disclosure.

As shown in FIG. 2, the present embodiment further provides an initial view angle control and presentation system based on a three-dimensional point cloud. The system includes a parsing module configured to read and parse a three-dimensional media stream; an initial view angle determination module configured to determine an initial viewpoint, a normal vector direction of the initial viewpoint and a forward direction vector of the initial viewpoint; a displacement feedback module configured to feed back a relative displacement of a real-time user position relative to the initial viewpoint; a scaling scale determination module configured to determine a scaling scale designated by a content producer or determine a scaling scale set based on a depth value calculated based on the relative displacement; a changed viewpoint determination module configured to determine the position of a changed viewpoint and a normal vector direction of the changed viewpoint; a view range determination module configured to determine a view range at the current user position based on the field of view within the viewpoint at the user position and a depth value; and a three-dimensional media presentation module configured to present part media content corresponding to the view range in the three-dimensional media stream or present all of the media content in the three-dimensional media stream.

In this embodiment, the initial view angle control and presentation method and system based on a three-dimensional point cloud can indicate the initial viewing direction in which the user consumes the three-dimensional point cloud media content. Thus, the user can view an initial angle, that is, a region of interest, designated by a content producer when initially consuming three-dimensional media content, thereby satisfying the user's initial presentation requirements of three-dimensional visual media. Moreover, the initial view angle control and presentation method and system based on a three-dimensional point cloud allow the functions of scale transformation and view angle change, thereby further satisfying user requirements and experience in scenes such as point cloud media scaling and rotation. Furthermore, the initial view angle control and presentation method and system based on a three-dimensional point cloud can indicate interactive behaviors performed when the user consumes the three-dimensional point cloud media content, thereby acquiring the three-dimensional point cloud media content capable of satisfying user interactive scenes.

In conjunction with application scenes, solutions of the present disclosure are described in more detail with reference to drawings and embodiments.

The presentation of three-dimensional point cloud digital cultural heritage is used as an example. Digitization of cultural heritage means that three-dimensional point cloud data of the cultural heritage is acquired using the laser scanning technology, three-dimensional reconstruction of the cultural heritage is performed, and cultural relics are archived so that the connotation of the cultural heritage is displayed permanently and completely. A user has different consumer demands for different types of cultural relics, such as large relics, small relics and large historical sites.

Embodiment One

For a three-dimensional point cloud model of a small cultural relic, a media content producer may designate the initial direction of the presentation of a media content file opened by a user, that is, designate position information of an initial viewpoint, normal vector information of the initial viewpoint and forward direction vector information of the initial viewpoint, to provide the user with an initial presentation region of interest and not to provide the user with a strange angle.

Embodiment Two

For the scene of cultural relic presentation of a digital museum, the scene of rotation of a point cloud object needs to be allowed. An initial viewing direction is used in the point cloud presentation at an initial instant. As the point cloud object rotates, the presentation direction for the next instant needs to be designated. The position of the changed viewpoint after the rotation and the normal vector direction of the changed viewpoint are determined so that a user can still view a part attracting the interest of the user, instead of viewing at a strange angle. Moreover, the function of scaling the point cloud object needs to be allowed. Specifically, the scaling scale or scaling factor of the object is determined so that the user can view the local details or overall appearance of a cultural relic in all directions and at multiple scales.

Embodiment Three

Figure 32:
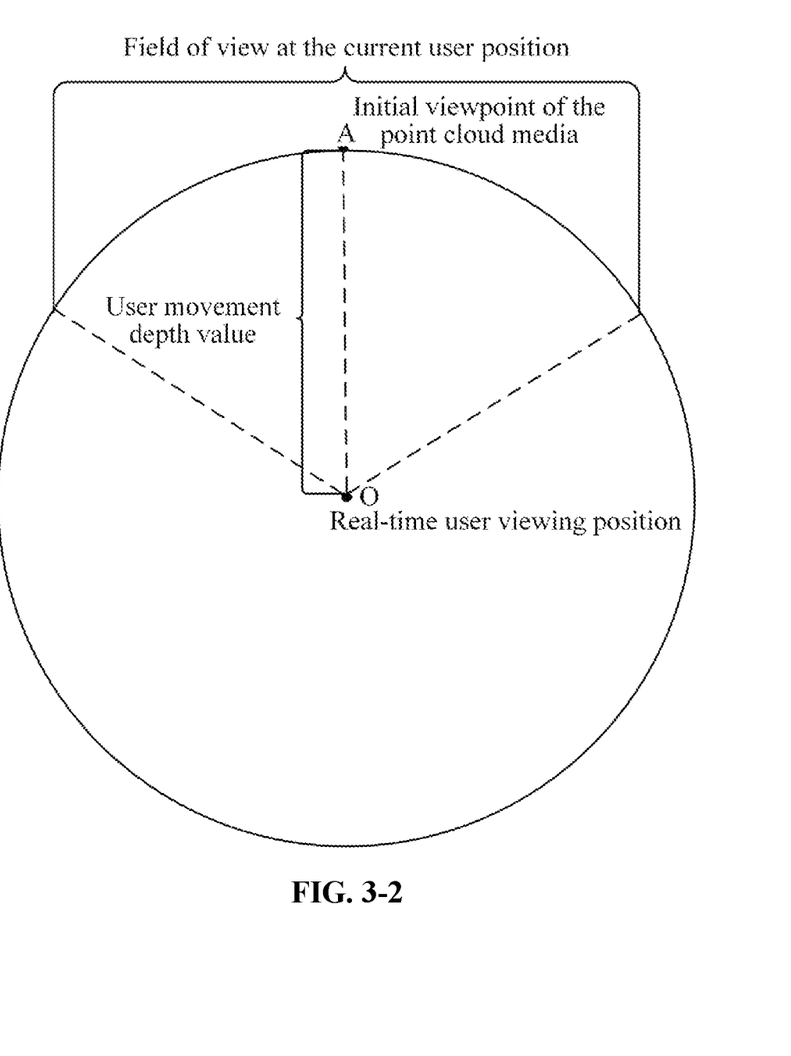

As shown in FIGS. 3-1 and 3-2, for a three-dimensional point cloud model of a large historical site, such as a virtual reality museum, a user can interact, in the exhibition area, with a surrounding three-dimensional point cloud scene and a nearby three-dimensional point cloud object. The seen exhibition area varies with the user position. The effect of moving towards or away from the viewed object in the real world is simulated. That is, the actual viewing region of the user can be adapted to interactive behaviors (referred to as real-time relative displacement). For example, the user can view a more detailed part of the scene by moving towards exhibits to obtain an immersive user experience.

In this scene, in addition to allowing presentation information including the initial direction of the presented three-dimensional point cloud media content and the rotation information of the presented three-dimensional point cloud media content, the user can consume the three-dimensional point cloud media content in an immersive manner. For example, the user is allowed to walk freely in the scene. In this case, a client feeds back the real-time relative displacement of the user to a server by finding the real-time user position. The server obtains the relative distance, that is, the depth value, between the current user viewing position and the initial viewpoint based on the fed-back real-time user position, determines the scaling factor at the current position and the field of view of the user at the current position based on the parsed depth value, and then presents the field of view corresponding to the current user viewing position to the user to satisfy the demand for the effect of moving towards or away from the viewed object in the real world when the user is walking in the scene.

To achieve the preceding object, it is needed to add new indication information to the encapsulation information of the three-dimensional point cloud media data. The indication information includes information one: position information of the initial viewpoint; information two: position information of a normal vector of the initial viewpoint relative to the initial viewpoint; and information three: information about the forward direction vector of the initial viewpoint. The indication information further includes at least one of information four: information about the scaling scale of the three-dimensional media; information five: position information of a changed viewpoint and position information of a normal vector of the changed viewpoint relative to the changed viewpoint; information six: real-time relative displacement which is position information of a real-time user position relative to the initial viewpoint; or information seven: a view range adjusted based on the real-time user position.

Information identification is performed on the initial view angle and presentation of the three-dimensional media content. The identification information indicates position information of the initial viewpoint, normal vector information of the initial viewpoint, forward direction vector information of the initial viewpoint, scaling scale information, position information of the changed viewpoint, normal vector information of the changed viewpoint, real-time user viewing position information, and the view range corresponding to the current user viewing position.

In view of the preceding problem, it is feasible to reasonably add the indication information and fields below according to requirements when encapsulating and transmitting the three-dimensional media stream.

viewpoint_x which indicates x coordinate information of the position of the initial viewpoint.

viewpoint_y which indicates y coordinate information of the position of the initial viewpoint.

viewpoint_z which indicates z coordinate information of the position of the initial viewpoint.

normal_x which indicates x coordinate information of the normal vector of the initial viewpoint relative to the initial viewpoint.

normal_y which indicates y coordinate information of the normal vector of the initial viewpoint relative to the initial viewpoint.

normal_z which indicates z coordinate information of the normal vector of the initial viewpoint relative to the initial viewpoint.

scale_factor which indicates scaling factor information.

forward_direction_vector_x which indicates x coordinate information of the forward direction vector of the initial viewpoint relative to the initial viewpoint.

forward_direction_vector_y which indicates y coordinate information of the forward direction vector of the initial viewpoint relative to the initial viewpoint.

forward_direction_vector_z which indicates z coordinate information of the forward direction vector of the initial viewpoint relative to the initial viewpoint.

rotation_included_flag which indicates whether rotation is allowed during media playback, that is, whether the initial view angle is changed during media playback. rotation_included_flag 0 indicates that rotation is not allowed during media playback, that is, the initial view angle is not changed during media playback. Otherwise, the initial view angle is changed. Position information of the changed viewpoint is indicated by viewpoint_rx, viewpoint_ry and viewpoint_rz. Normal vector information of the changed viewpoint is indicated by normal_rx, normal_ry and normal_rz.

viewpoint_rx indicates x coordinate information of the position of the changed viewpoint.

viewpoint_ry indicates y coordinate information of the position of the changed viewpoint.

viewpoint_rz indicates z coordinate information of the position of the changed viewpoint.

normal_rx indicates x coordinate information of the normal vector of the changed viewpoint relative to the changed viewpoint.

normal_ry indicates y coordinate information of the normal vector of the changed viewpoint relative to the changed viewpoint.

normal_rz indicates z coordinate information of the normal vector of the changed viewpoint relative to the changed viewpoint.

real_time_interaction_flag indicates whether real-time user position interaction is allowed during media playback. When the real_time_interaction_flag is equal to 0, it is indicated that real-time user position interaction is not allowed during media playback. Otherwise, it is indicated that real-time user position interaction is allowed during media playback. Real-time user position interactive information is indicated by vposition_x, vposition_y and vposition_z.

vposition_x indicates x coordinate information of the real-time user position relative to the initial viewpoint.

vposition_y indicates y coordinate information of the real-time user position relative to the initial viewpoint.

vposition_z indicates z coordinate information of the real-time user position relative to the initial viewpoint.

move_depth indicates the relative distance, that is, depth information, between the real-time user position and the initial viewpoint and can be obtained based on fed-back coordinate information of the real-time user position: vposition_x, vposition_y and vposition_z. viewing_range_field indicates the view range of the user at the real-time position and can be determined based on a viewing depth and the scaling factor.

In the embodiments below, for convenience of description, a description is given with reference to one set of the preceding information. In other embodiments, a description may be given with reference to other information.

Based on the preceding information, definitions of modules in the initial view angle control and presentation method and system based on a three-dimensional point cloud according to the present disclosure in conjunction codes are described using InitialViewingOrientationSample as an example. The indication length and symbol type of each piece of indication information are known from the source codes and are not described here.

```
aligned(8) class Initial ViewingOrientationSample( ) {
    InitialViewingOrientationStruct( );
    RotationInfoStruct( );
    RealTimeInteractionInfoStruct( );
    bit(7) reserved = 0;
}
```

The definition of the initial viewing direction includes an initial viewing direction module (optional), a rotation information module (optional) and a real-time interactive information module (optional).

```
aligned(8) class InitialViewingOrientationStruct( ) {
    signed int(32) viewpoint_x;
    signed int(32) viewpoint_y;
    signed int(32) viewpoint_z;
    signed int(32) normal_x;
    signed int(32) normal_y;
    signed int(32) normal_z;
    unsigned int(32) scale_factor;
    signed int(32) forward_direction_vector_x;
    signed int(32) forward_direction_vector_y;
    signed int(32) forward_direction_vector_z;
}
```

The initial viewing direction module (optional) includes x coordinate information of the position of the initial viewpoint, y coordinate information of the position of the initial viewpoint and z coordinate information of the position of the initial viewpoint; x coordinate information of the normal vector of the initial viewpoint relative to the initial viewpoint, y coordinate information of the normal vector of the initial viewpoint relative to the initial viewpoint and z coordinate information of the normal vector of the initial viewpoint relative to the initial viewpoint; and x coordinate information of the forward direction vector of the initial viewpoint relative to the initial viewpoint, y coordinate information of the forward direction vector of the initial viewpoint relative to the initial viewpoint and z coordinate information of the forward direction vector of the initial viewpoint relative to the initial viewpoint.

```
aligned(8) class RotationInfoStruct(rotation_included_flag){
    if (rotation_included_flag){
        signed int(32) viewpoint_rx;
        signed int(32) viewpoint_ry;
        signed int(32) viewpoint_rz;
        signed int(32) normal_rx;
        signed int(32) normal_ry;
        signed int(32) normal_rz;
    }
}
```

In the rotation information module (optional), when information indicating whether rotation is allowed during media playback, that is, whether the initial view angle is changed during media playback exists, the initial viewing direction module should include the rotation information module. The rotation information module includes x coordinate information of the position of the changed viewpoint, y coordinate information of the position of the changed viewpoint and z coordinate information of the position of the changed viewpoint; and x coordinate information of the normal vector of the changed viewpoint relative to the changed viewpoint, y coordinate information of the normal vector of the changed viewpoint relative to the changed viewpoint and z coordinate information of the normal vector of the changed viewpoint relative to the changed viewpoint.

```
aligned(8) class RealTimeInteractionStruct(real_time_interaction_flag){
    if(real_time_interaction_flag){
        signed int(32) vposition_x;
        signed int(32) vposition_y;
        signed int(32) vposition_z;
        unsigned int(32) move_depth;
        unsigned int(32) viewing_range_field;
    }
}
```

In the real-time interactive information module (optional), when information indicating whether real-time user position interaction is allowed during media playback exists, the initial viewing direction module should include the real-time interactive information module. The real-time interactive information module includes x coordinate information of the real-time user position relative to the initial viewpoint, y coordinate information of the real-time user position relative to the initial viewpoint, z coordinate information of the real-time user position relative to the initial viewpoint, the relative distance, that is, depth information, between the real-time user position and the initial viewpoint, scaling factor information and the view range of the user at the real-time position.

The meanings of the preceding information and fields have been described in the preceding part.

It is to be noted that in the present disclosure, scalability is described using the structures and fields in the preceding codes as an example, and scalability may be described through items other than the preceding structures, fields and sizes thereof.

In this embodiment, Initial ViewingOrientationSample is merely used as an example and is not intended to limit the scope of the present disclosure. The proposed solutions are illustrated herein but are also applicable to other file encapsulation protocols.

Based on the preceding description, definitions of different pieces of indication information in different application examples are given below.

The presentation of three-dimensional point cloud digital cultural heritage is used as an example. Digitization of cultural heritage means that three-dimensional point cloud data of the cultural heritage is acquired using the laser scanning technology, three-dimensional reconstruction of the cultural heritage is performed, and cultural relics are archived so that the connotation of the cultural heritage is displayed permanently and completely. A user has different consumer demands for different types of cultural relics, such as large relics, small relics and large historical sites.

For a three-dimensional point cloud model of a small cultural relic, a media content producer may designate the initial direction, scaling scale and rotation information of the presentation of a media content file opened by a user, that is, designate position information viewpoint_x, viewpoint_y and viewpoint_z of an initial viewpoint, normal vector information normal_x, normal_y and normal_z of the initial viewpoint, forward direction vector information forward_direction_vector_x, forward_direction_vector_y and forward_direction_vector_z of the initial viewpoint, and the scaling factor scale_factor and designate, according to whether rotation is allowed, the position information viewpoint_rx, viewpoint_ry and viewpoint_rz of the changed viewpoint and the normal vector information normal_rx, normal_ry and normal_rz of the changed viewpoint so that a cultural relic can be viewed in all directions and at multiple scales.

As shown in FIGS. 3-1 and 3-2, for a three-dimensional point cloud model of a large historical site, such as a virtual reality museum, a user can interact, in the exhibition area, with a surrounding three-dimensional point cloud scene and a nearby three-dimensional point cloud object. The seen exhibition area varies with the user position. The effect of moving towards or away from the viewed object in the real world is simulated. That is, the actual viewing region of the user can be adapted to interactive behaviors (referred to as real-time relative displacement). For example, the user can view a more detailed part of the scene by moving towards exhibits to obtain an immersive user experience. In this scene, in addition to allowing presentation information including the initial direction, scaling scale and rotation information of the presented three-dimensional point cloud media content, that is, position information viewpoint_x, viewpoint_y and viewpoint_z of an initial viewpoint, normal vector information normal_x, normal_y and normal_z of the initial viewpoint, forward direction vector information forward_direction_vector_x, forward_direction_vector_y and forward_direction_vector_z of the initial viewpoint, and the scaling factor scale_factor; and the position information viewpoint_rx, viewpoint_ry and viewpoint_rz of the changed viewpoint and the normal vector information normal_rx, normal_ry and normal_rz of the changed viewpoint that are designated according to whether rotation is allowed, the user can consume the three-dimensional point cloud media content in an immersive manner.

As shown in FIG. 3-3, the user is allowed to walk freely in the scene. For example, the user moves from position A (user viewing position at the previous instant) to position B (the current user viewing position). The depth value OB between the user position and the initial viewpoint is the modulus of the relative displacement OA between the user position and the initial viewpoint. In this case, a client feeds back the real-time relative displacement of the user to a server by finding the real-time user position information vposition_x, vposition_y and vposition_z. The server obtains the relative distance, that is, the depth value move_depth, between the current user viewing position and the initial viewpoint based on the fed-back real-time user position information vposition_x, vposition_y and vposition_z, determines the field of view viewing_range_field of the user at the current position based on the parsed depth value and the scaling factor, and then presents the field of view corresponding to the current user viewing position to the user to satisfy the demand for the effect of moving towards or away from the viewed object in the real world when the user is walking in the scene.

The present disclosure further provides a three-dimensional point cloud system (not shown). The three-dimensional point cloud system includes the preceding initial view angle control and presentation system based on a three-dimensional point cloud.

As is known to those skilled in the art, in addition to implementing the system, apparatus and modules according to the present disclosure in a manner of computer-readable program codes, it is feasible to logically program method steps to make the system, apparatus and modules according to the present disclosure implemented, in a manner of the same programs, in forms such as logic gates, switches, application-specific integrated circuits, programmable logic controllers and embedded microcontrollers. Therefore, the system, apparatus and modules according to the present disclosure may be regarded as hardware components, and modules included therein for implementing various programs may also be regarded as structures inside the hardware components; and modules for implementing various functions may also be both regarded as software programs for implementing methods and regarded as structures inside the hardware components.

The preceding describes embodiments of the present disclosure. It is to be understood that the present disclosure is not limited to the preceding embodiments and that various variations or modifications may be made by those skilled in the art within the scope of the claims, not affecting the spirit of the disclosure. If not in collision, embodiments of the present application and features in embodiments of the present application may be combined with each other.

What is claimed is:

1. An initial view angle control and presentation method based on a three-dimensional point cloud, comprising:
   reading and parsing a three-dimensional media stream to obtain encapsulated three-diminsional media data;
   determining, in the encapsulated three-dimensional media data, an initial viewpoint, a normal vector direction of the initial viewpoint and a forward direction vector of the initial viewpoint; and
   presenting media content in the three-dimensional media stream based on the initial viewpoint, the normal vector direction of the initial viewpoint and the forward direction vector of the initial viewpoint.

2. The method according to claim 1, wherein in response to the media content being rotated, the method further comprises:
   changing the initial viewpoint and the normal vector direction of the initial viewpoint to form a position of the changed viewpoint and a normal vector direction of the changed viewpoint.

3. The method according to claim 1, wherein
   the forward direction vector of the initial viewpoint is a direction vector parallel to a forward direction specified by a presentation device, and
   the forward direction vector of the initial viewpoint comprises x coordinate information, y coordinate information and z coordinate information of a forward direction vector endpoint other than the initial viewpoint, wherein the x coordinate information, the y coordinate information and the z coordinate information are in a coordinate system whose origin is the initial viewpoint.

4. The method according to claim 1, wherein indication information is added to encapsulation information of the encapsulated three-dimensional media data, wherein the indication information comprises:
   information one: position information of the initial viewpoint;
   information two: position information of a normal vector of the initial viewpoint relative to the initial viewpoint; and
   information three: information about the forward direction vector of the initial viewpoint.

5. The method according to claim 1, wherein a normal vector of the initial viewpoint comprises x coordinate information, y coordinate information and z coordinate information of a normal vector endpoint other than the initial viewpoint, wherein the x coordinate information, the y coordinate information and the z coordinate information are in a coordinate system whose origin is the initial viewpoint.

6. The system according to claim 5, wherein the indication information further comprises:
   information six: real-time relative displacement which is position information of a real-time user position relative to the initial viewpoint; and
   information seven: a view range adjusted based on the real-time user position.

7. An initial view angle control and presentation system based on a three-dimensional point cloud, comprising a processor and a memory for storing execution instructions that when executed by the processor cause the processor to perform steps in following modules:
   a parsing module configured to read and parse a three-dimensional media stream to obtain encapsulated three-dimensional media data;
   an initial view angle determination module configured to determine, in the encapsulated three-dimensional media data, an initial viewpoint, a normal vector direction of the initial viewpoint and a forward direction vector of the initial viewpoint; and
   a three-dimensional media presentation module configured to present media content in the three-dimensional media stream based on the initial viewpoint, the normal vector direction of the initial viewpoint and the forward direction vector of the initial viewpoint.

8. The system according to claim 7, further comprising:
   a changed viewpoint determination module configured to, in response to the media content being rotated, change the initial viewpoint and the normal vector direction to determine a position of the changed viewpoint and a normal vector direction of the changed viewpoint.

9. The system according to claim 7, wherein indication information is added to encapsulation information of the encapsulated three-dimensional media data, wherein the indication information comprises:
   information one: position information of the initial viewpoint;
   information two: position information of a normal vector of the initial viewpoint relative to the initial viewpoint; and
   information three: information about the forward direction vector of the initial viewpoint.

10. The system according to claim 7, wherein the indication information further comprises rotation indication information for indicating whether the media content is rotatable.

11. The system according to claim 7, wherein the indication information further comprises information for indicating whether real-time user position interaction is allowed during media playback.

12. The system according to claim 7, wherein
the forward direction vector of the initial viewpoint is a direction vector parallel to a forward direction specified by a presentation device, and
the forward direction vector of the initial viewpoint comprises x coordinate information, y coordinate information and z coordinate information of a forward direction vector endpoint other than the initial viewpoint, wherein the x coordinate information, the y coordinate information and the z coordinate information are in a coordinate system whose origin is the initial viewpoint.

13. The system according to claim 7, wherein a normal vector of the initial viewpoint comprises x coordinate information, y coordinate information and z coordinate information of a normal vector endpoint other than the initial viewpoint, wherein the x coordinate information, the y coordinate information and the z coordinate information are in a coordinate system whose origin is the initial viewpoint.

14. A non-transitory computer-readable storage medium storing computer-executable instructions which, when executed by a processor, cause the processor to perform steps in following modules:
a parsing module configured to read and parse a three-dimensional media stream to obtain encapsulated three-dimensional media data;
an initial view angle determination module configured to determine, in the encapsulated three-dimensional media data, an initial viewpoint, a normal vector direction of the initial viewpoint and a forward direction vector of the initial viewpoint; and
a three-dimensional media presentation module configured to present media content in the three-dimensional media stream based on the initial viewpoint, the normal vector direction of the initial viewpoint and the forward direction vector of the initial viewpoint.

* * * * *